(12) United States Patent
Wimböck et al.

(10) Patent No.: US 10,637,851 B2
(45) Date of Patent: Apr. 28, 2020

(54) INTRODUCING AN IDENTITY INTO A SECURE ELEMENT

(71) Applicant: GIESECKE & DEVRIENT GMBH, München (DE)

(72) Inventors: Ulrich Wimböck, Tutzing (DE); Jens Rudolph, München (DE)

(73) Assignee: GIESECKE & DEVRIENT GMBH, München (DE)

( * ) Notice: Subject to any disclaimer, the term of this patent is extended or adjusted under 35 U.S.C. 154(b) by 222 days.

(21) Appl. No.: 15/536,247

(22) PCT Filed: Dec. 15, 2015

(86) PCT No.: PCT/EP2015/002581
§ 371 (c)(1),
(2) Date: Jun. 15, 2017

(87) PCT Pub. No.: WO2016/096146
PCT Pub. Date: Jun. 23, 2016

(65) Prior Publication Data
US 2017/0374063 A1 Dec. 28, 2017

(30) Foreign Application Priority Data
Dec. 16, 2014 (DE) .................. 10 2014 018 867

(51) Int. Cl.
*H04L 29/06* (2006.01)
*H04L 9/08* (2006.01)
(Continued)

(52) U.S. Cl.
CPC .......... *H04L 63/0853* (2013.01); *H04L 9/088* (2013.01); *H04L 9/0866* (2013.01);
(Continued)

(58) Field of Classification Search
None
See application file for complete search history.

(56) References Cited

U.S. PATENT DOCUMENTS 5,367,148 A * 11/1994 Storch ............... G06F 11/14
235/375
7,225,337 B2  5/2007 Baessler
(Continued)

FOREIGN PATENT DOCUMENTS

DE  102008024798 A1  12/2009
EP      1365537 A1  11/2003
(Continued)

OTHER PUBLICATIONS

Bin et al., "Data Security Analysis of the Mass Producing Process of Smart Cards," IEEE 2010 International Conference on E-Business and E-Government, pp. 1316-1319, URL: http://ieeexplore.iee.org/stamp.jsp?tp=&arnumber=5591112.
(Continued)

*Primary Examiner* — Benjamin E Lanier
(74) *Attorney, Agent, or Firm* — Workman Nydegger

(57) ABSTRACT

A method for introducing an identity into a secure element includes an operating system loaded into the secure element, which comprises a master key which is identical for a plurality of secure elements. A secure-element key datum is generated employing the master key. The secure-element key datum is configured as a temporary secure-element key datum, which, upon an initial authentication of the secure element vis-à-vis the background system, is replaced by a final secure-element key datum which is independent of the master key by employing the temporary secure-element key datum and is itself rendered invalid for further authentications.

8 Claims, 1 Drawing Sheet

(51) Int. Cl.
*H04W 12/06* (2009.01)
*H04W 12/04* (2009.01)
*H04W 12/00* (2009.01)
*G09C 1/00* (2006.01)

(52) U.S. Cl.
CPC ........... *H04W 12/04* (2013.01); *H04W 12/06* (2013.01); *G09C 1/00* (2013.01); *H04W 12/0023* (2019.01)

(56) References Cited

U.S. PATENT DOCUMENTS

| | | | |
|---|---|---|---|
| 8,571,537 | B2 | 10/2013 | Kaliner |
| 8,837,740 | B2 | 9/2014 | Gessner et al. |
| 9,646,172 | B1* | 5/2017 | Hahn ................. G06F 21/6227 |
| 2002/0018569 | A1* | 2/2002 | Panjwani .............. H04L 63/061 380/247 |
| 2003/0221104 | A1 | 11/2003 | Baessler |
| 2005/0083846 | A1* | 4/2005 | Bahl ..................... H04W 12/06 370/236 |
| 2006/0233364 | A1* | 10/2006 | Camenisch .............. H04L 9/14 380/44 |
| 2009/0019284 | A1* | 1/2009 | Cho ..................... H04W 12/06 713/170 |
| 2010/0190473 | A1* | 7/2010 | Ishikawa ................. H04W 8/24 455/411 |
| 2011/0136482 | A1 | 6/2011 | Kaliner |
| 2012/0257757 | A1 | 10/2012 | Gessner et al. |
| 2013/0275973 | A1* | 10/2013 | Greenfield .......... G06F 9/44584 718/1 |
| 2015/0020158 | A1* | 1/2015 | Kruglick .............. H04L 63/083 726/3 |

FOREIGN PATENT DOCUMENTS

| | | |
|---|---|---|
| GB | 2512944 A | 10/2014 |
| WO | 2011076491 A1 | 6/2011 |
| WO | 2013124194 A1 | 8/2013 |
| WO | 2014094615 A1 | 6/2014 |

OTHER PUBLICATIONS

German Office Action for corresponding German Application No. 102014018867.1, dated Oct. 5, 2015.
International Search Report for corresponding International PCT Application No. PCT/EP2015/002581, dated Mar. 7, 2016.
Matsunaka et al., "Device Authentication and Registration Method Assisted by a Cellular System for User-driven Service Creation Architecture," IEEE 2009 Consumer Communications and Networking Conference, Jan. 10, 2009, pp. 1-5.

* cited by examiner

| HS1,2 | SE | |
|---|---|---|
| OS [MK] ⟶ | StartOS: MK-DK(MK/ChipID) | 1 |
| ⟵ | Auth (DK) | 2 |
| Gen (SE-ID, SK), Invalid (DK) | | 3 |
| SK {alternative: SE-ID} ⟶ | {alt: Gen SK} | 4 |
| ⟵ | Auth (SK) | 5 |

INTRODUCING AN IDENTITY INTO A SECURE ELEMENT

FIELD OF THE INVENTION

The invention relates to a method for introducing an identity into a secure element.

For using a mobile terminal, such as a smart phone or mobile phone, in a mobile communication network of a network operator, the terminal contains a secure element. A further and commonly used term for the secure element in the mobile communication field is subscriber identity module. The secure element can be configured either as a removable plug-in SIM card (SIM=Subscriber Identity Module) or USIM card (Universal SIM) or UICC (Universal Integrated Circuit Card), or alternatively as a permanently soldered in eUICC (embedded UICC) or eSIM or eUSIM.

STATE OF THE ART

In the production of secure elements an individual identity must be introduced into each secure element. Subsequently a subscription can be loaded into the secure element, which comprises data sets (e.g. keys) for use of the terminal in the mobile communication network. The subscription does not form the object of the invention. The identity usually comprises two components. A first component is an anonymous number called ID. A second component is a key set consisting of one or a plurality of secure-element keys associated with the ID. Each ID must be assigned uniquely. An ID must not be assigned twice. As the secure-element key optionally either a symmetric or an asymmetric key can be provided.

One known method for introducing the identity into a secure element is the individual personalization of each single secure element. Here, personalization data have to be implemented in each single secure element at a personalization station in a production environment. This process is slow and in particular takes a lot of time within the production environment and is therefore expensive.

Outside the mobile communication field, it is known to have a secure element individualize itself on the basis of a universal master key. For this purpose, the same identical operating system (OS) comprising the master key is loaded into each secure element of a batch of secure elements. Starting from the master key and an individual information item (e.g. a chip serial number of a chip contained in the secure element or a random number) each secure element derives internally an individual secure-element key. The master key is administrated by a certification body that can later verify the authenticity of secure-element keys by means of the master key, so that only such secure-element keys are recognized as genuine which are derived from or with the master key. When a random number is employed, there is a risk of collision between secure-element keys of different secure elements, i.e. the individuality of the secure-element key is not automatically ensured. Such a downstream generation of secure-element keys has the advantage that in the production environment only the operating system identical for all secure elements has to be programmed. The time-consuming individualization can be effected outside of the production environment, for example by the end user, thus not blocking any production resources. A weak point of the method is that when the master key becomes known, secure-element keys which are recognized as genuine upon verification can be derived without authorization.

There are in principle two possibilities for deriving a secure-element key from a master key, namely a symmetric and an asymmetric key derivation method.

In the symmetric key derivation method a symmetric secure-element key is derived from a symmetric master key and an individual information item, such as e.g. a chip serial number or a random number.

In the asymmetric key derivation method, a public-private key pair comprising a public key and the corresponding (secret) private key is generated by the secure element. As the master key, the private key of the certification body is provided in this case. The secure element generates a secure-element signature by signing its own public key with the master key, thus the private key of the certification body. For checking the authenticity of the secure element, the certification body verifies the secure-element signature with its public key.

SUMMARY OF THE INVENTION

It is the object of the invention to create a secure method for introducing an identity into a secure element in which the individual personalization of each secure element can be omitted and all secure elements can be programmed identically in the production environment—at least in a first production step.

The object is achieved by a method according to claim 1. Advantageous embodiments of the invention are specified in the dependent claims.

In the method according to claim 1 a universal operating system is introduced into a secure element, preferably in the form of an operating-system memory image. In the introduced operating system or memory image a master key is contained. From the master key, first a secure-element key datum is derived in the secure element, for example in the manner that is known per se.

The method of the invention according to claim 1 is characterized in that a secure-element key datum derived from a master key (e.g. symmetric secure-element key or asymmetric secure-element key signed with the master key, see alternative embodiments according to claims 2 and 3) is valid temporarily only for the initial authentication. Once said authentication has been effected, the temporary secure-element key datum is replaced by a final secure-element key datum. Subsequent authentications can be effected (successfully, i.e. positively) only with the final secure-element key datum. The temporary secure-element key datum becomes invalid. Since the final secure-element key datum is independent of the master key, when a master key is corrupt the final secure-element key data are not corrupt likewise as a result. Rather, there is the possibility of not at all admitting temporary secure-element key data derived from the corrupt master key for generating final secure-element key data. Thereby, secure elements whose underlying master keys have been corrupted are never released permanently for authentication in the mobile communication network, thus are never activated in the mobile communication network.

Therefore, according to claim 1, a secure method for introducing an identity into a secure element is created which can do without individual personalization of each secure element.

The master key is preferably administrated by a certification body, which generates and later verifies the master key.

As ID, for example a hardware identifier of a chip of the secure element can be provided, for example a chip serial number or card serial number.

The initial authentication is effected optionally by the end user when he puts his mobile terminal in operation for the first time with the secure element, in order to activate the secure element in the mobile communication network of his chosen provider and to thereby make his mobile phone operational. Alternatively, the initial authentication, i.e. activation of the secure element, is effected already by the terminal manufacturer, and the terminal is issued to the end customer with an already activated secure element.

In particular, also a method is specified according to a first, symmetric embodiment, according to claim 2, wherein as the master key a symmetric key of a certification body is provided, in step b) in the secure element a symmetric, temporary secure-element key is derived from the master key and an individualization datum, in particular an individual datum of the secure element or a random number, as the temporary secure-element key datum, and in step c) upon the initial authentication, the background system assigns a final ID to the secure element, and a symmetric final secure-element key is generated as the final secure-element key datum either in the background system or in the secure element, and is transmitted to that instance of the secure element and the background system which has not generated the final secure-element key.

Further, also a method is specified according to a second, asymmetric embodiment, according to claim 3, wherein as the master key, a private key of a certification body is provided, in step b) in the secure element a temporary public-private key pair is generated comprising a temporary secure-element public key and a temporary secure-element private key, and as the secure-element key datum a temporary secure-element signature is generated by signing the temporary secure-element public key with the master key, and in step c) in the secure element a final public-private key pair is generated comprising a final secure-element public key and a final secure-element private key, wherein, upon the initial authentication, the final secure-element public key is transmitted to the background system, and wherein as the final secure-element key datum a final secure-element signature is generated in the background system by the background system signing the final secure-element public key with the master key, and wherein the final secure-element signature is transmitted by the background system to the secure element.

In the asymmetric case (claim 3) the certification body generates a public-private master key pair. The private master key of this pair serves for authentication of a signature sent by the secure element, said signature having been generated with the public master key.

The symmetric and the asymmetric embodiments both have the advantage that the final secure-element key datum is generated and loaded into the secure element in coordination with the background system. Thus collisions between identities can be prevented through control on the part of the background system.

In the asymmetric variant of the method the secure-element signature is optionally generated more exactly by the background system signing the concatenation of the final secure-element public key and additionally the ID with the master key. As the ID either the original ID or a final ID newly generated upon the initial authentication can be provided.

In step c) optionally further upon the initial authentication the temporary secure-element key datum is verified in the background system and the final secure-element key datum is derived only in the positive case of a positive verification. Otherwise, in the negative case of erroneous verification no final secure-element key datum is derived. As the negative case it can be provided in particular that the master key, which underlies the freshly verified secure element, has become known as corrupt to the background system. If the temporary secure-element key datum were used directly for permanent authentication, an attacker could generate and distribute large quantities of valid secure-element key data. In the solution according to the invention, a secure element whose temporary secure-element key datum is generated from a corrupt master key is not given a permanently valid secure-element key datum. Thus, the secure element can never be used for making phone calls.

Optionally, the master key is deleted from the secure element after deriving the temporary secure-element key datum, in particular either immediately after deriving the temporary secure-element key datum or at the latest after deriving the final secure-element key datum. Thereby, the master key, which is no longer required anyway, cannot not be spied out from the secure element. When the secure element leaves the secure production environment it preferably no longer contains a master key.

Optionally, the operating system is loaded into the secure element in the form of an operating-system memory image (OS image, OS=operating system).

Optionally, the master key is changed regularly, regularly being determined on the basis of a lapse of time or frequency of use, for example. More specifically, this is for example realized by the master key having a limited validity to the effect that a temporary secure-element key datum that is positively verifiable upon verification can be generated only within the limited validity, in particular within a specified validity period or/and for a specified number of generations of a temporary secure-element key datum.

Optionally, an initial authentication of the secure element vis-à-vis the background system is carried out employing the temporary secure-element key datum, whereupon the temporary secure-element key datum is replaced by the final secure-element key datum and the secure element is activated for authentication in the mobile communication network. Through the activation the secure element can be employed permanently in the mobile communication network, in particular for telephone calls, data exchange, and the like. The term permanently is understood here to mean that any limitations of use such as an expiration of contract, SIM lock, contract termination by not topping up credit or the like are taken into account, and the activation is nevertheless regarded as "permanent" within the meaning of the invention.

Optionally, the ID is configured as a temporary ID, in particular as a temporary ID which is identical for all or a plurality of secure elements, wherein the temporary ID is replaced by a final ID upon initial authentication. Thereby, the entire identity (comprising ID and secure-element key datum) is replaced upon initial authentication, from a temporary identity to a final identity. This embodiment can be used particularly advantageously in a scenario in which an entire batch of secure elements is first equipped with one and the same identical identity. This makes the production of the secure elements easy, quick and inexpensive. The secure elements are made distinguishable by final, unique identities only upon initial authentication.

BRIEF DESCRIPTION OF THE DRAWINGS

In the following the invention will be explained in more detail on the basis of embodiment examples and with reference to the drawing, in which there are shown.

DETAILED DESCRIPTION OF EMBODIMENT EXAMPLES

Figures 1, 2:
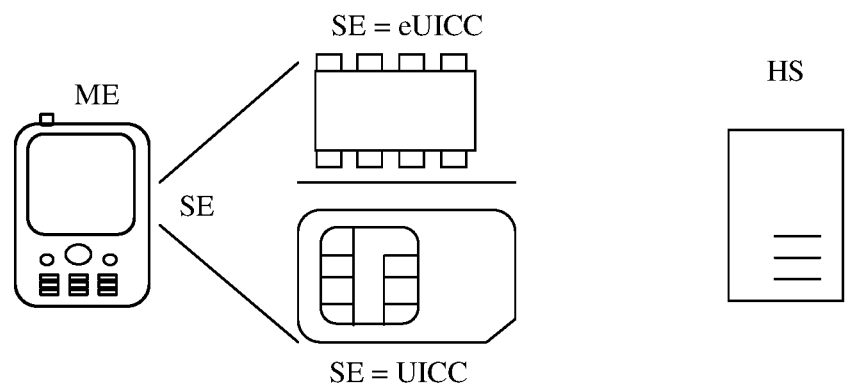
FIG. 1 a mobile terminal with two possible secure elements and a background system.
FIG. 2 a flow chart for deriving a final secure-element key datum.

FIG. 1 shows a mobile terminal ME with two possible secure elements SE, namely an embedded SE eUICC and a SIM card UICC, and a background system HS.

FIG. 2 shows a flow chart of a method for deriving a final secure-element key datum SK in a secure element SE (=eUICC or UICC) as those shown in FIG. 1.

In a step 1, which is effected in a production environment at the manufacturer of the secure element, a memory image OS[MK] of an operating system OS is provided in the background system HS1 of the manufacturer. The memory image OS[MK] contains a master key MK. The memory image OS[MK] is loaded into the secure element SE and implemented there. On the occasion of the initial startup of the operating system OS, a temporary secure-element key datum DK is derived from the master key MK, employing a chip serial number ChipID. The master key MK is deleted from the secure element SE. The secure element SE is now delivered to a trader, and eventually to a user (end user), or directly to a user (end user). In an embedded secure element eUICC the entire mobile terminal ME is delivered with the secure element to the trader or user. As mentioned, alternatively, the secure element SE can be activated by the terminal manufacturer (steps 2, 3, 4 described below) and can be issued to the trader or end customer only then.

In a step 2, the user puts his mobile terminal ME with the secure element SE in operation and causes the activation of its secure element in the background system HS2 of his network operator (which is usually different from the background system of the manufacture of the secure element). For activation, the user sends an authentication request with the temporary secure-element key datum DK to the background system HS2 of his network operator.

In a step 3, the background system HS2 of the network operator checks the authentication request, in the positive case generates a final secure-element key datum SK and a final secure element ID SE-ID and invalidates the temporary secure-element key datum DK, thus rendering it invalid. In a step 4, the background system HS2 sends the final secure-element key datum SK to the secure element SE. According to a variant of the method, in step 4 only a final secure element ID SE-ID is generated by the background system and sent to the secure element SE, and in the secure element SE the final secure-element key datum SK is generated. The mobile terminal ME is now ready for use.

In a step 5 the user makes a phone call with the mobile terminal ME, thereby carrying out an authentication with the final secure-element key datum SK vis-à-vis the background system HS2.

The invention claimed is:

1. A method for introducing an identity into a secure element, wherein
the secure element is prepared for authenticating a mobile terminal in which the secure element is operated vis-à-vis a background system of the mobile communication network,
the identity includes an ID and a secure-element key datum, and
the secure-element key datum is adapted to carry out the authentication, a) into the secure element an operating system is loaded which comprises a master key which is identical for a plurality of secure elements, the operating system comprising the master key being loaded from a first server controlled by an entity that generates the operating system comprising the master key,
b) the secure-element key datum is generated employing the master key after which the master key is completely deleted from the secure element operating system, the master key being completely deleted from the secure element while the secure-element is under the control of the entity that generates the operating system comprising the master key,
wherein
c) the secure-element key datum is configured as a temporary secure-element key datum, which, upon an initial authentication of the secure element vis-à-vis the background system employing the temporary secure-element key datum, is replaced by a final secure-element key datum which is independent of the master key and is generated after the master key has been deleted, and is itself rendered invalid for further authentications, wherein the final secure-element key datum is loaded from a second server that is different from the first server and is part of the background system of the mobile communication network, network,
wherein:
as the master key a private key of a certification body is provided,
in step b) in the secure element a temporary public-private key pair is generated, comprising a temporary secure-element public key and a temporary secure-element private key, and as the secure-element key datum a secure-element signature is generated by signing the temporary secure-element public key with the master key, and
in step c) in the secure element a final public-private key pair is generated, comprising a final secure-element public key and a final secure-element private key, wherein, upon the initial authentication, the final secure-element public key is transmitted to the background system, and wherein as the final secure-element key datum a final secure-element signature is generated in the background system by the background system signing the final secure-element public key with the master key, and wherein the final secure-element signature is transmitted by the background system to the secure element.

2. The method according to claim 1, wherein the secure-element signature is generated more exactly by the background system signing the concatenation of the final secure-element public key and the ID with the master key, wherein as the ID there is provided either the ID or a final ID generated upon the initial authentication.

3. The method according to claim 1, wherein in step c) upon the initial authentication, the temporary secure-element key datum is verified by the background system and the final secure-element key datum is derived only in the positive case of a positive verification, and otherwise no final secure-element key datum is derived.

4. The method according to claim 1, wherein the master key is deleted from the secure element after deriving the temporary secure-element key datum, and therein either immediately after deriving the temporary secure-element key datum or at the latest after deriving the final secure-element key datum.

5. The method according to claim 1, wherein the operating system is loaded into the secure element in the form of an operating-system memory image.

6. The method according to claim 1, wherein the master key has a limited validity to the effect that a temporary secure-element key datum which is positively verifiable upon a verification can be generated at most within the limited validity, within a specified period of validity and/or for a specified number of generations of a temporary secure-element key datum.

7. The method according to claim 1, wherein an initial authentication of the secure element vis-à-vis the background system is effected employing the temporary secure-element key datum, whereupon the temporary secure-element key datum is replaced by the final secure-element key datum and the secure element is activated for authentication in the mobile communication network.

8. The method according to claim 1, wherein the ID is configured as a temporary ID identical for the or for a plurality of secure elements, and wherein upon the initial authentication the temporary ID is replaced by a final ID.

* * * * *